United States Patent [19]

Blanchard

[11] Patent Number: 5,473,454
[45] Date of Patent: Dec. 5, 1995

[54] ELLIPTICAL DIFFUSER

[75] Inventor: Randall D. Blanchard, Vista, Calif.

[73] Assignee: Hughes Aircraft Company, Los Angeles, Calif.

[21] Appl. No.: 427,303

[22] Filed: Apr. 24, 1995

Related U.S. Application Data

[63] Continuation of Ser. No. 71,126, Jun. 2, 1993, abandoned.
[51] Int. Cl.$^6$ ............................ G02B 5/02; G02F 1/1335; G03B 21/60
[52] U.S. Cl. ............................ 359/69; 359/452; 359/599
[58] Field of Search ........................ 359/599, 452–456, 359/69

[56] References Cited

U.S. PATENT DOCUMENTS

| | | | |
|---|---|---|---|
| 1,399,566 | 12/1921 | Lazarus | 359/452 |
| 2,287,556 | 6/1942 | Land | 359/452 |
| 4,936,659 | 6/1990 | Anderson et al. | 359/69 |
| 4,989,933 | 2/1991 | Duguay | 359/599 |
| 5,307,205 | 4/1994 | Ludwig, Jr. et al. | 359/453 |
| 5,384,658 | 1/1995 | Ohtake et al. | 359/599 |

FOREIGN PATENT DOCUMENTS

| | | | |
|---|---|---|---|
| 0464499 | 1/1992 | European Pat. Off. | |
| 0495679 | 7/1992 | European Pat. Off. | |
| 1060459 | 2/1954 | France | 359/454 |
| 540567 | 10/1941 | United Kingdom | 359/452 |

OTHER PUBLICATIONS

IBM Tech. Dis. Bull., vol. 29, No. 1. "Light Diffuser . . ." pp. 276–279, Jun. 1986.

*Primary Examiner*—Martin Lerner
*Attorney, Agent, or Firm*—Terje Gudmestad; W. K. Denson-Low

[57] ABSTRACT

A display screen of a projection system embodying a cathode ray tube, liquid crystal light valve, laser or the like is formed of a plastic sheet (22, 22a) that has embedded therein a number of microsphere diffuser particles (24, 24a) initially having a spherical shape and distributed in a uniformly isotropic density. The plastic sheet and its embedded particles are heated and stretched in a single direction and allowed to cool in their elongated form so that the diffuser particles (24a) then have an elongated elliptical shape and a density that is greater along one axis than it is along an orthogonal axis. The particle elongation and decreased density in the direction of stretch cause the diffusing sheet to have a diffusion cone angle (44), as measured in a plane containing the axis of stretch, that is significantly decreased, but with increased screen gain, whereas the diffusion angle (42) in the orthogonal unstretched direction remains relatively large, and also has an increased screen gain. The decreased diffusion angle is oriented in a vertical direction in a common display because the viewer's eye, in looking at a display screen, is most commonly positioned within a relatively small vertical cone angle, although the horizontal angle of view may be considerably larger.

10 Claims, 4 Drawing Sheets

ELLIPTICAL DIFFUSER

CROSS REFERENCE TO RELATED APPLICATIONS

This application is a continuation of U.S. patent application Ser. No. 08/071,126, filed Jun. 2, 1993, now abandoned.

BACKGROUND OF THE INVENTION

1. Field of the Invention

The present invention relates to improved diffuser material, and more particularly concerns high efficiency diffuser material that can be applied to optical systems requiring controlled diffusion.

2. Description of Related Art

The function of the projection screen of an optical projection display system is to present a visible display of imaging light that it receives, regardless of whether the light is produced by a cathode ray tube, a liquid crystal light valve, a laser, or other image source. The screen forms a visible image by diffusing and re-radiating light energy incident on the screen surface. The front projection screen includes a diffusion sheet comprising diffusion particles and a reflective rear face so that light striking the front of the screen is reflected and passes through the diffusing particles twice. The rear projection screen also includes a diffusion sheet carrying diffusion particles but receives light striking the rear of the screen, passes it through its diffusion particles only once, and transmits diffused light from its front face.

Whether used in a front projection or rear projection configuration, the screen has a major impact on image quality and viewability, which may be defined as the zone in which the image is of acceptable luminance. A high screen gain enhances viewability. Screen gain is the comparison of (a) the luminance of a projected image at various viewing angles, with (b) the luminance produced by a perfectly diffusing surface (e.g. a Lambertian surface). The ideal diffuser has a gain of unity, and produces the same luminance at all viewing angles, that is, it is non-directional. A Lambertian diffuser has the same luminance screen in all directions, which falls off as the cosine of viewing angle.

Projection systems employing such viewing screens are often made with highly directional screens to increase screen gain so as to produce sufficient luminance. However, because the screen itself cannot generate light, any increase in luminance at a particular viewing angle causes a decrease in luminance at other viewing angles. Nevertheless, because many systems are normally viewed only at a small viewing angle, or because a high gain small viewing angle is deemed to be worth a decreased illumination at large viewing angles, shaping of screen diffusion patterns may be desirable.

To provide a diffusing screen with increased screen gain the diffused light pattern has been shaped to change it from its normally circular format to an elliptical pattern. However, prior beam shaping materials and techniques are difficult and expensive to manufacture and use. For example, holographic diffusers have been employed having controllable micro-variations in refractive index of a volume hologram to achieve adjusted refractive index variations and selected scattering patterns. These holographic devices are limited in size.

Some front projection screens have been constructed utilizing mathematically designed micro-mirror contoured reflecting surfaces to catch and return projected light directionally in a precisely focused manner. Again, these arrangements are difficult to manufacture and exceedingly expensive.

Accordingly, it is an object of the present invention to provide a screen having improved controlled diffusion characteristics while avoiding or minimizing above mentioned problems.

SUMMARY OF THE INVENTION

In carrying out principles of the present invention in accordance with a preferred embodiment thereof, a diffuser is formed of a transparent substrate that carries a plurality of diffuser particles either embedded in the substrate or applied to the surface. The diffuser particles are elliptical in shape and have a first substantially uniform density and alignment in a first direction and a second substantially uniform but smaller density in a second angulated direction. According to a feature of the invention, a diffuser having a controlled asymmetry of diffusion is formed by providing a substrate having a plurality of diffusion particles which, in an initial condition of the substrate, are substantially spherical and uniformly dispersed throughout, stretching the substrate in a first direction to elongate the spheres into an elliptical shape with a controlled alignment and to increase distances between the particles in the first direction, and fixing the substrate in its stretched condition.

DESCRIPTION OF THE PREFERRED EMBODIMENTS

Figure 1:
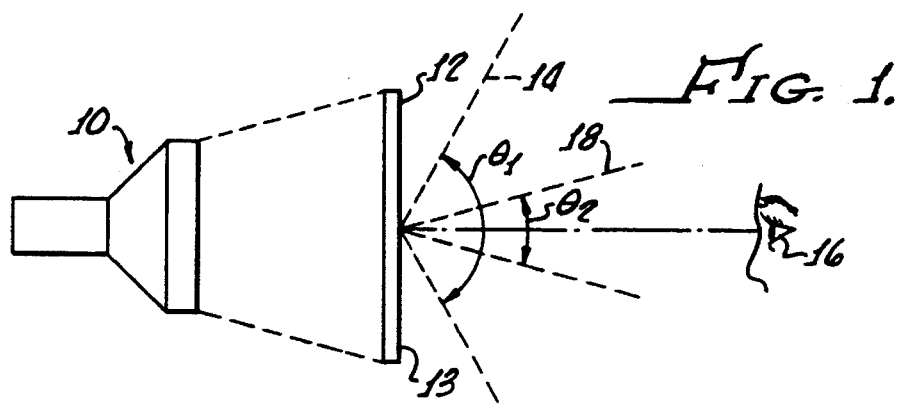
FIG. 1 is a much simplified side elevational view of part of a projection system, illustrating vertical viewing angles.

FIG. 1 is a very much simplified illustration of parts of a projection system including an image projector having a projection lens, generally indicated at 10, which projects an image upon a rear projection screen, indicated at 12. Although a rear projection screen is employed, it will be readily understood, as the description proceeds, that principles of the present invention are equally applicable to both rear and front projection screen configurations. The projection screen 12, in previously known configurations, is treated in any one of a number of standard techniques, as for example by applying a coating of diffusion particles such as glass or plastic beads on one surface thereof. This provides a uniform isotropic diffusion of light of the image that is produced by the projector on the rear of the screen. The screen produces a circular diffusion pattern of light radiating from its front face 13. For many types of diffusing screens the light is widely dispersed in a vertical cone angle $\Theta_1$, as indicated by dotted lines 14 for example, and in a similar horizontal cone angle (not shown in FIG. 1). Thus a person, indicated by eye 16, anywhere within the horizontal or vertical cone angle will be able to view the image on the screen. As the position of the viewing eye approaches the limit of the cone angle, the luminescence of the screen decreases and, at extreme angles, the image viewed may be very dim.

In normal viewing circumstances, viewing position may vary widely from side to side, that is, in a horizontal direction, and thus a relatively wide horizontal viewing angle is desired. However, in many projection systems, it is seldom, if ever, that a viewer would be positioned in a vertical direction on or beyond the boundaries of the much smaller vertical cone angle $\Theta_2$, indicated by dotted lines 18. In fact, a vertical viewing angle of as little as 10° to 15° or less is adequate in many applications. For a circular diffusion pattern having relatively large vertical cone angle, then, much of the light transmitted by the screen is transmitted either above or below the eye of the user and is effectively useless. For this reason, complex diffusion pattern controlling arrangements, such as holographic devices, arrays of micro-mirrors and the like, have been used to provide an elliptical diffusion pattern, that is, a diffusion pattern having a relatively wide cone angle in a horizontal direction and a relatively narrow cone angle in a vertical direction.

Figure 2:
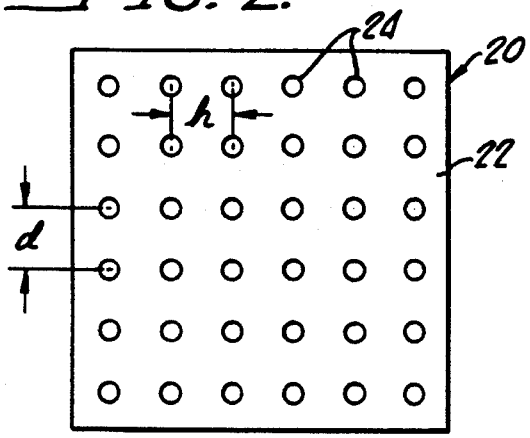
FIG. 2 is a schematic illustration of a sheet material, prior to processing, having spherical diffusing particles uniformly and isotropically distributed over its surface.
Figure 3:
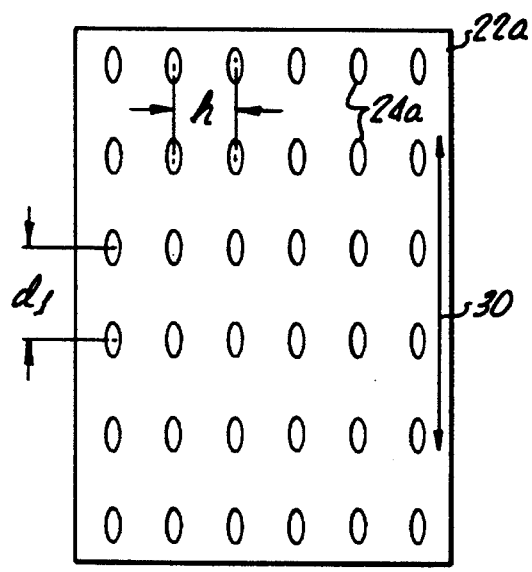
FIG. 3 illustrates the material of FIG. 2 after it has been processed to change the shape and the uniform isotropic distribution of its diffusing particles.

According to one aspect of the present invention a controlled, primarily elliptical diffusion pattern is inexpensively and easily provided in a diffusing screen by causing the diffusing particles to have an elongated shape and be distributed through the screen with different densities in two mutually orthogonal directions. In accordance with one embodiment of the invention, a transparent polymeric light diffuser material, such as the sheet 20 illustrated in FIG. 2, includes a thin acrylic polymer matrix 22 containing a plurality of acrylic diffuser particles 24. One such material is a diffusion material sold under the trademark Plexiglas L by Rohm and Haas Company of Bristol, Pa. The material is basically formed as a suspension or emulsion of seven micron particles, e.g. microspheres, in a Plexiglas acrylic matrix and is available in varying thicknesses, including 0.5 millimeters thickness and 3 millimeters thickness. The embedded particles have a generally spherical configuration. A thickness of 3 millimeters is preferred for the practice of the present invention. The commercially available diffuser material illustrated in FIG. 2 is modified according to principles of the present invention to provide a matrix 22a that is elongated (stretched) in a vertical direction, as is illustrated by the stretch axis 30 in FIG. 3. Particles 24a of the stretched material 22a still have substantially the same horizontal particle spacing has the spacing of the original material in its natural state, as shown in FIG. 2. However, the vertical spacing d, which is shown in FIG. 2 and which, in the natural state material, is equal to the horizontal spacing, now has been increased to the distance $d_1$ in the uniformly vertically elongated material of FIG. 3. Distance $d_1$ is substantially equal to 2d. This stretching process reduces the sheet thickness to about one half the original thickness and elongates the spherical particles to an elliptical shape as shown in FIG. 3. The stretched elliptically shaped particles act as an anamorphous lens.

To stretch the material it is clamped in a fixture, when it is in the configuration illustrated in FIG. 2, placed in an oven and heated to about 320° F. While heated, the material is stretched in the vertical direction to effectively double its vertical length and elongate the embedded particles. The elongated material, still under tension, and still clamped and stretched, is removed from the oven and allowed to cool. When cool the material sets and retains its stretched elongated shape in which the diffusion particles 24a remain in the dispersion pattern and particle shape illustrated in FIG. 3 and described above. This is a pattern having a considerably lower particle density in a vertical direction than in the horizontal direction, and wherein the embedded particles are vertically elongated.

Figure 4:
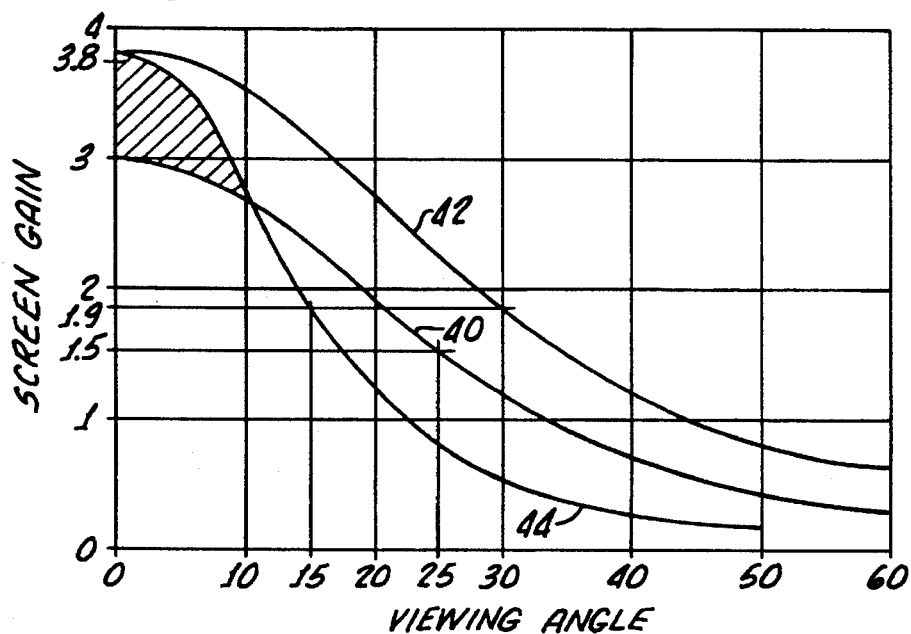
FIG. 4 comprises a group of graphs illustrating variation of screen gain with viewing angle.

Illustrated in FIG. 4 are graphs illustrating screen gain as plotted against viewing angle. The diffusion pattern of the standard material (before stretching) of FIG. 4 is a circular cone, with the same diffusion in horizontal and vertical axis. Processes of the present invention modify only this diffusion pattern. Curve 40 illustrates the screen gain of a diffuser screen employing unmodified and unstretched Plexiglas L diffuser material. This is the commercially available material of FIG. 2. Curve 40 shows the screen to have a maximum gain of ≠on the screen axis (e.g. at 0° viewing angle) and a half angle of 25°, that is, a gain of half the maximum at a viewing angle of 25°, relative to the screen axis. The screen gain, as shown by curve 40, for the standard unmodified, unstretched and unelongated Plexiglas L material is the same for both horizontal and vertical directions.

Curve 42 illustrates the screen gain in the horizontal direction for the stretched material illustrated in FIG. 3. Note that the maximum gain on the screen axis is about 3.8, and the half gain angle, that is, half of the maximum gain, occurs at a viewing angle of about 30°. Further, it can be noted from the comparison of curves 40 and 42 that the horizontal gain of the elongated material is considerably greater throughout its broad horizontal viewing angle than is the gain of the unmodified material.

Curve 44 of FIG. 4 shows the screen gain of the stretched material of FIG. 3 along the vertical axis. Again, a maximum screen gain is nearly 3.8. From on axis to a viewing angle of slightly more than 10°, screen gain of the stretched material in the vertical direction, as shown by curve 44, is considerably greater than the screen gain of the unmodified material, as shown by curve 40. This increased gain along the vertical axis within the relatively narrow vertical viewing angle (about ±10°) is shown by the hatched area between curves 40 and 44, above curve 40 and below curve 44. At vertical viewing angles greater than about 10° screen gain for the stretched material is less than screen gain for the standard material. The vertical half gain angle is 15. However, as previously mentioned, vertical viewing angles greater than about 15 almost never occur, and thus lack of gain at such larger vertical angles causes no loss in luminance to the viewer's eye. However, the decreased screen gain at the larger vertical viewing angles illustrates the fact that the diffusing screen does not create any light, but rather re-directs the light so that effectively light that otherwise would be dispersed at larger vertical angles by the unmodified diffuser material is now concentrated in a narrower vertical angle. This creates a higher luminescence in the smaller vertical angle. Note that increased luminescence (increased screen gain) is provided over relatively wide horizontal viewing angles, curve 42, as compared to horizontal angle screen gain of the standard material, curve 40.

Figure 5:
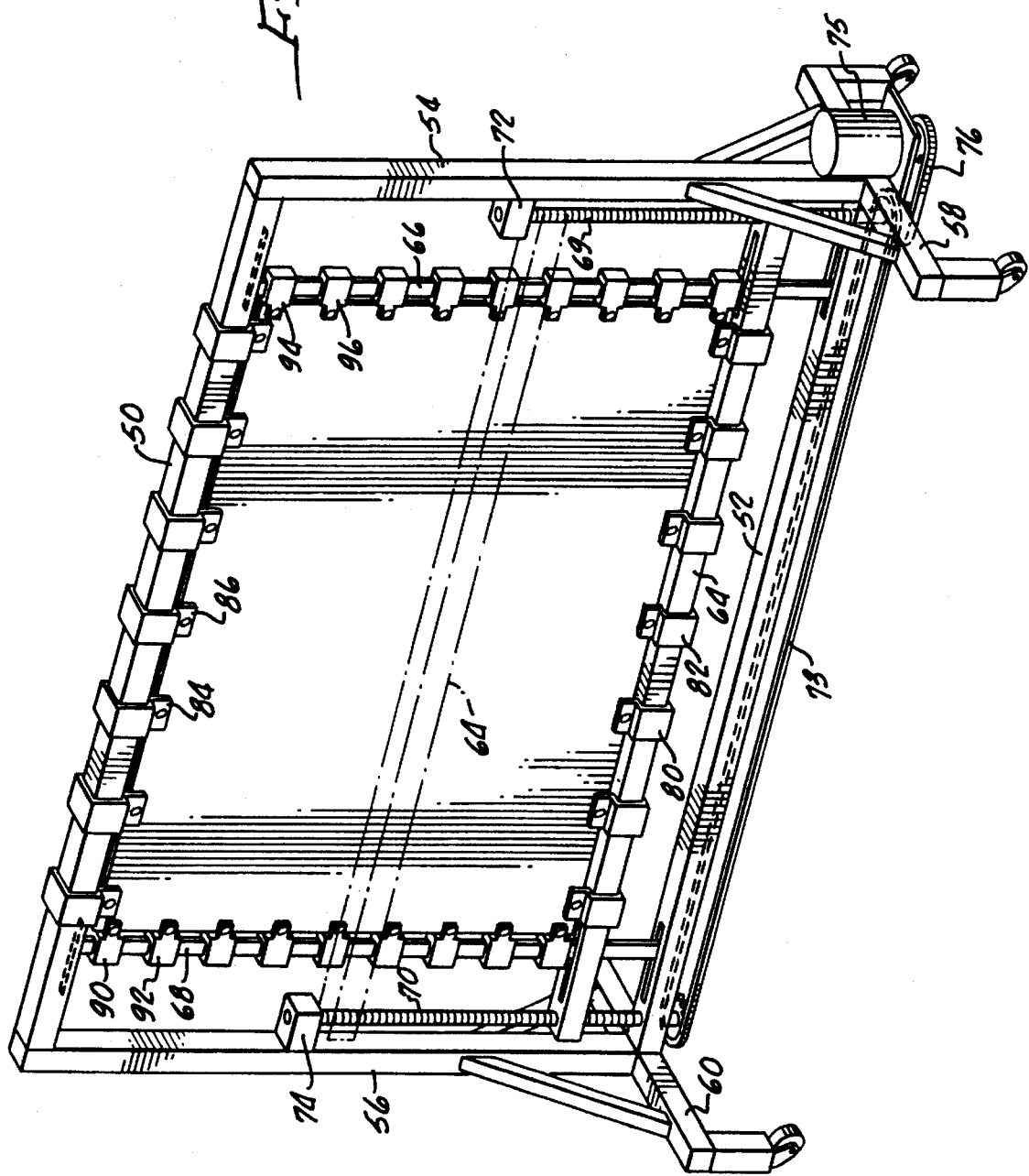
FIG. 5 is a simplified pictorial illustration of one apparatus for stretching a sheet of diffusing material.
Figure 6:
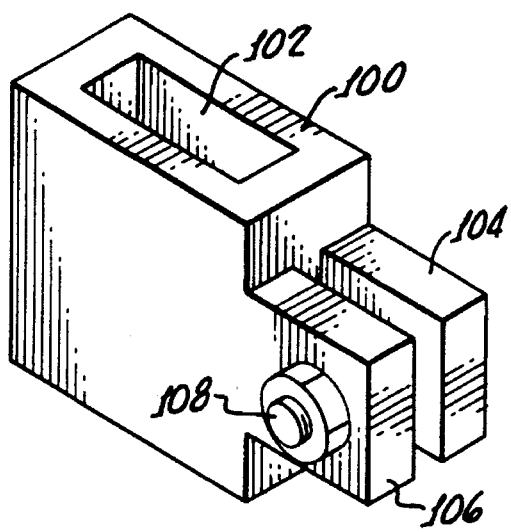
FIG. 6 and 7 are detailed illustrations of exemplary clamps that may be employed with the apparatus of FIG. 5.
Figure 7:
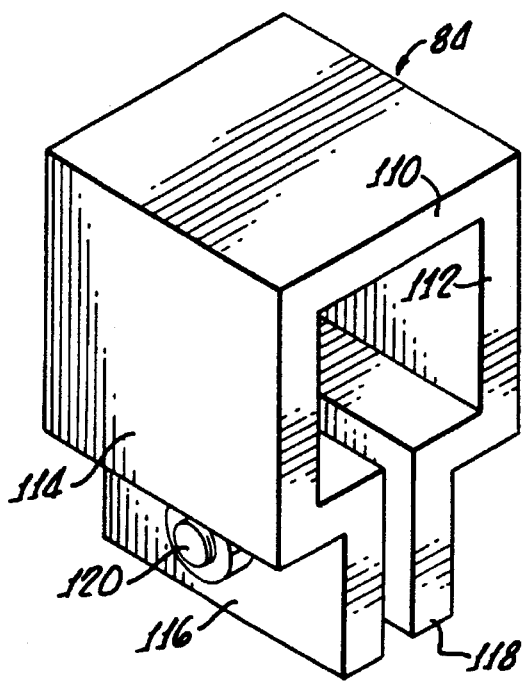

It will be readily understood that many different types of stretching fixtures may be employed to stretch the standard material. Illustrated in FIG. 5 is one such fixture. It includes a rectangular frame having top and bottom horizontal posts 50,52 fixedly interconnected by vertical standards 54,56 which are mounted on wheel supports 58,60. An intermediate horizontal bar 64 is slidably mounted for vertical motion on vertical slide posts 66,68 which extend between the upper and lower horizontal bars 50,52 adjacent the vertical posts 54,56. Posts 66,68 are mounted in slots to provide small amounts of horizontal motion. A pair of vertical jack screws 69,70 are journaled in the lower bar 52 and in upper fixtures 72,74. A chain 73, driven by a motor 75 and a coupling chain 76, rotates the screws in unison to drive intermediate horizontal bar 64 upwardly or downwardly along the slide posts 66,68. A plurality of lower clamps, such as clamps 80,82, are mounted on the movable intermediate bar 64, and a plurality of upper clamps, such as clamps 84,86, are mounted on the upper bar 50. The lower and upper clamps 80–86 are mounted for a small amount of horizontal motion to accommodate narrowing of the sheet, which may be allowed to occur as the sheet is vertically stretched.

A plurality of side clamps such as those indicated at 90,92 are mounted for vertical slidable motion on slide posts 68, and similar clamps 94,96 are mounted for slidable motion on post 66. Each side clamp, all of which may be identical to one another, may include a clamp body 100 having a slot 102 that slidably receives the vertical post. A pair of relatively movable clamp fingers 104,106 are fixed to the clamp body and adjusted by a screw 108 to clamp a portion of a diffuser sheet therebetween.

Upper and lower clamps, which may be identical to one another, each includes a top section 110, and a pair of vertically directed flanges 112,114 that slidably circumscribe horizontal bar 50. Relatively movable clamping fingers 116,118 fixed to flanges 112,114 are adjusted relative to one another by a clamp screw 120 to firmly grasp a portion of a diffuser sheet therebetween. In an exemplary embodiment, the fixture shown in FIG. 5 has a length from side to side of about 11 feet, and a total height of about 7½ feet.

In use of the fixture a commercially available sheet of Plexiglas L, having a horizontal dimension of 10 feet for example and a vertical dimension of 3½ feet, is mounted to the fixture with its long edges clamped to upper and lower bars 50 and 64 and its shorter vertical edges clamped in clamps 90,92,94 and 96. Initially lower bar 64 is in an upper position, as shown in dotted lines in FIG. 5. The sheet is positioned flat, but not stretched, and clamped between its upper and lower edges and its side edges, and the entire fixture is wheeled into an oven and heated to approximately 320° F. While it is at such temperature it is stretched by operating the screws 69,70 to drive the lower bar 64 downwardly. The bar is driven downwardly in an even manner, maintaining its horizontal position at all times. The clamps 90,92,94,96 on the vertical bars slide downwardly along the vertical posts 66,68 as the material is stretched, and, in addition, move inwardly by a small amount by means of the small horizontal motion of the vertical posts, because the material may decrease in width as it is stretched.

The clamps 80,82,84 and 86 on the upper and lower horizontal bars 50,64 also move horizontally as the material is stretched by sliding horizontally by relatively small amounts along the horizontal bars 50,64. The resulting sheet is stretched to attain dimensions of about 7'×9', providing a nearly two to one vertical stretch. The amount of horizontal narrowing which may increase density of diffusion particles in the horizontal direction is very small and does not significantly affect dispersion pattern. Even this small amount of narrowing may be eliminated, if desired, by restraining inward motion of posts 66,68. The resulting elongated sheet will thus provide material sufficient to build either a 4.5'×6' or a 6'×8' front or rear projection screen. The side clamps are provided to maintain some degree of uniformity of direction of the vertical edges as the material is stretched. The stretching force employed during the stretching is relatively moderate because of the softened heated state of the material. However, after the stretching has been completed the material is removed from the oven with all clamps and clamping bars remaining in the same position. As the material cools, the holding forces become significantly greater, with the sheet being under tension until it is fully cooled and set in its stretched elongate condition. When cooled, the sheet permanently retains its stretched elongated condition.

As the sheet stretches in the vertical direction the diffusing particles are spaced further and further apart and their vertical density decreases, as previously described. In the course of the described stretching of the Plexiglas L material it is found that the microsphere diffuser particles, which in the standard unmodified material are basically spherical, are actually deformed into an elliptical shape, being elongated along the stretch or vertical axis.

If a curved screen is desired, the stretched and curved sheet may be placed in a mold that will retain the stretched condition of the sheet, and then heated, shaped to a desired curvature, and then cooled to a permanently stretched and curved condition.

The described diffuser, as previously mentioned, may be used in either a rear projection or a front projection screen. For a rear projection screen a material thickness prior to stretching of about 3 millimeters is employed. For a front projection screen, light goes through the diffuser twice because the diffuser is provided with a reflective back surface. Therefore, for use of principles of the present invention in a front projection screen, particle density of the material in its standard form and material thickness need be only one half of that which is employed to obtain the same performance in a rear projection screen. Front projection screens may employ an aluminized CAP material on the back and a transparent acrylic ⅜ inch thick panel with a hard coated surface on the front. Rear projection screens may utilize one or more transparent layers of diffuser sheets to provide various fields of view. Material thickness and fill percentage of the diffuser particles may be varied to provide optimum results. A typical material particle fill percentage is between about 20% and 30%. A Plexiglas L material having an initial thickness of 0.060 inches is used, and, after stretching has a thickness of 0.030 inches.

Many standard diffuser screens employ a surface coating of beaded plastic or other diffusion particles, particularly for those screens employed as front projection screens. It is contemplated that such beaded front projection screens, initially having a substantially uniform isotropic density of hemispherical diffusion particles, also be modified to provide an elliptical diffusion pattern, as described above. The material with its beaded surface is stretched in the manner described above in connection with the Plexiglas L material, and thus the beaded plastic particles on the surface of the screen, after elongation of the screen substrate, have an elongated semi-elliptical shape and a greater density in the horizontal direction than in the vertical direction.

Figure 8:
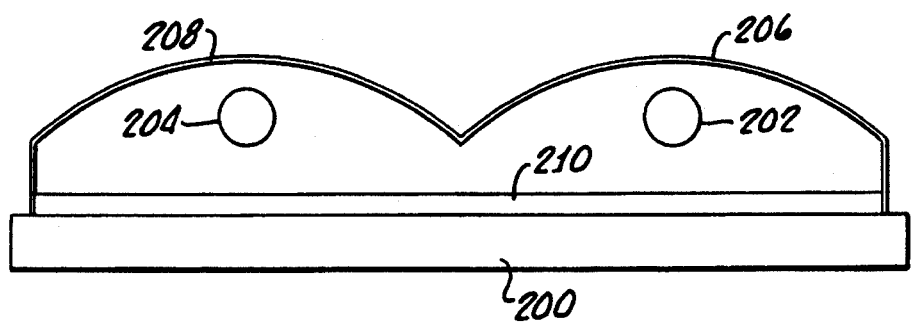
FIG. 8 is a simplified schematic illustration of a flat panel display utilizing an elliptical diffuser of the present invention as part of a rear light source.

The described elliptical diffusion pattern sheets may be employed for back lighting of a liquid crystal display panel. Thus, as shown in FIG. 8, a liquid crystal display panel 200 is to be illuminated by a rear lighting source having a diffuse illumination. The illumination source is formed of any suitable type of lamps, such as lamps 202,204, which are mounted in reflectors 206,208 at a short distance immediately to the rear of the liquid crystal display 200. Instead of employing a standard diffuser to provide Lambertian distribution, an elliptical diffuser sheet of the type described above in connection with FIGS. 1–7 may be employed and positioned, as shown at sheet 210 in FIG. 8. Use of the elliptical diffuser sheet 210 in this case with the more limited diffusion angle will handle the light from the lamps 202,204, which may be ordinary fluorescent tubes. Light from the lamps is reflected from the reflectors to be concentrated in a smaller vertical viewing angle by elliptical diffuser sheet 210. Thus, a considerably smaller amount of the light is wasted. In other words, less light is transmitted through the liquid crystal module at angles beyond the viewing angle of the person watching the liquid crystal panel. A viewer in front of the display will effectively look directly through the liquid crystal panel to the diffuse light source behind it. A greatly increased apparent brightness or illumination is afforded the viewer because of the now decreased vertical viewing angle.

In some front projection screens, screen height, e.g. dimensions of the screen in the vertical direction, are desired to be greater than about 10 feet, which is twice the maximum width of available Plexiglas L material. According to the present invention, starting with a sheet that is 5 feet high (wide) and stretching it to about twice its height will yield a diffusing sheet with the desired elliptical diffusion pattern of 10 feet in height. To obtain a 20 foot high screen with the described improved narrowed vertical field of view one would simply join two such stretched vertically elongated sheets together. The elliptical diffuser described herein is a bulk material in which performance is based on the percentage of modifier (particles) added to the Plexiglass material, and also on the thickness of the material. Therefore it is important to control sheet thickness at the joint.

Figure 9A:
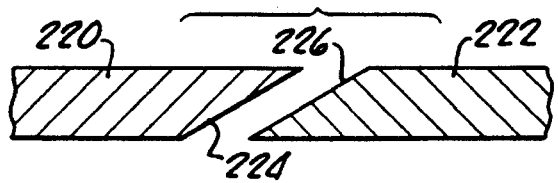
FIGS. 9a and 9b illustrate one method of joining two stretched elliptical diffuser panel sheets.
Figure 9B:
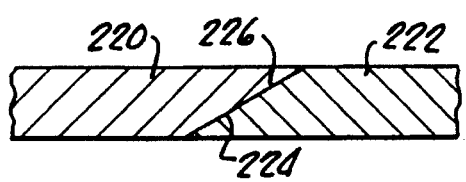

To obtain a large screen, such as a 20 foot screen, it is possible to join two stretched sheets of material together to obtain acceptable visual performance with a joint that is substantially invisible. A first manner of joining two such stretched elliptical diffuser sheets with a nearly invisible joint is illustrated in FIGS. 9a and 9b. These figures show a first stretched elliptical diffuser section 220 and second stretched elliptical diffuser section 222, each of which has adjoining edges cut at a diagonal, as indicated at edges 224 and 226. The two pieces are abutted along their slanted edges and bonded to one another with a solvent adhesive. In so joining these sheets it is important to maintain precision of the effective thickness of the bonded joint in order to ensure optimum performance of the elliptical diffusion.

Figure 10A:
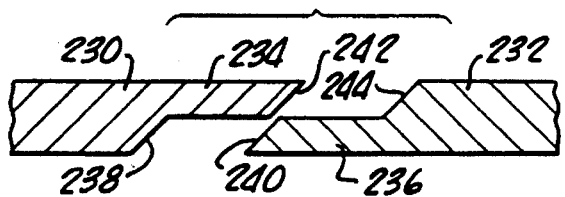
FIGS. 10a and 10b illustrate a second method of joining two stretched elliptical diffuser panel sheets.
Figure 10B:
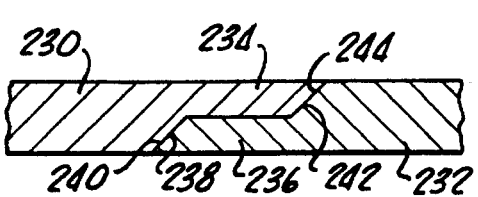

FIGS. 10a and 10b illustrate an alternate arrangement of effectively combining a diagonal joint with a half lapped joint in which a first stretched elliptical diffuser sheet section 230 is joined to a second sheet section 232, with the two sheets having overlapping rebated end portions 234,236, with diagonally cut edges 238,240 and 242,244. The two rebated end portions are lapped and thermo-pressure bonded, as shown in FIG. 10b. This type of joint results in less distortion of the asymmetrical bulk density characteristics of the diffuser with its embedded and stretched elliptical particles.

What is claimed is:

1. A diffuser comprising:
   a transparent acrylic substrate, having first and second mutually angulated axes defining first and second directions, and
   a plurality of acrylic diffuser particles of consistent, uniformly spherical configuration and size carried by said substrate, said particles being elongated in said second direction, said substrate further comprising a sheet of transparent polymeric light diffuser material having uniformly spherical microspheres of approximately seven microns in diameter embedded therein, wherein said acrylic substrate's thickness and a concentration of the acrylic diffuser particles has an approximately linear relationship, said sheet being stretched in a second direction, said microspheres being elliptically deformed and elongated in said second direction.

2. A diffuser screen made by the steps of:
   providing a sheet of acrylic plastic having acrylic diffusing microspheres of at least seven microns in diameter embedded therein and uniformly dispersed through said sheet, wherein said sheet of acrylic plastic's thickness and a concentration of the acrylic diffusing microspheres has an approximately linear relationship, and
   stretching said sheet in a first direction to increase distances between adjacent microspheres in said one direction without substantially changing distances between said microspheres in a second direction transverse to said first direction, and to elongate said microspheres in said first direction.

3. The diffuser screen of claim 2 wherein said step of stretching comprises clamping said sheet between first and second mutually spaced bars, heating said sheet and microspheres, moving said bars away from each other to stretch said microspheres and sheet while heated, and cooling said microspheres and sheet while they remain stretched to thereby set said microspheres and sheet in stretched condition.

4. The diffuser of claim 3 wherein said step of clamping comprises grasping said sheet at first and second edges to exert tension on said sheet while said bars are moved away from each other and while said sheet is cooling, and grasping said sheet at third and fourth edges while said bars are moved away from each other.

5. A diffuser comprising:
   a sheet of stretched transparent material,
   a plurality of elliptically deformed microspheres embedded in said sheet, said microspheres being elongated in a first direction and spaced from one another by relatively larger distances in said first direction and by relatively smaller distances in a second direction, said sheet of transparent material comprising first and second sections having adjoining edges that are cut at an angle and bonded to one another to maintain precision of effective thickness of the joined sections for maintaining optical performance of diffusion at the adjoining edges.

6. A diffuser comprising:
   a transparent polymeric light diffuser substrate that is stretched in a first one of first and second mutually orthogonal directions and not narrowed in said second direction,
   a plurality of acrylic diffuser particles of consistent, uniformly spherical configuration and size embedded in said substrate, wherein said substrate's thickness and a concentration of said diffuser particles has an approximately linear relationship, said diffuser particles comprising a plurality of elliptically deformed microspheres of at least seven microns in diameter that are elongated in said first direction, said elliptically deformed microspheres being spaced from one another in said first direction by distances that are substantially greater than the distances between particles in said second direction.

7. A diffuser comprising:

a transparent substrate that is stretched in a first one of first and second mutually orthogonal directions and not narrowed in said second direction wherein said transparent substrate comprises first and second stretched sheets, each stretched in said first direction and each having adjacent slanted edges, said slanted edges being bonded to each other with the slanted edges abutted against each other to form a diagonal point having an effective thickness that maintains optical performance of diffusion over said joint; and a plurality of diffuser particles embedded in said substrate, said particles comprising a plurality of elliptically deformed microspheres that are elongated in said first direction, said elliptically deformed microspheres being spaced from one another in said first direction by distances that are substantially greater than the distances between particles in said second direction.

8. A diffuser comprising;

a transparent substrate that is stretched in a first one of first and second mutually orthogonal directions and not narrowed in said second direction, wherein said transparent substrate comprises first and second stretched sheets, each stretched in said first direction and each having adjacent slanted edges, said slanted edges being bonded to each other with the slanted edges abutted against each other to form a diagonal point having an effective thickness that maintains optical performance of diffusion over said joint, wherein each of said slanted edges includes first and second slanted portions interconnected by a rebated portion, said slanted and rebated portions of the edges of said first and second sheets being mutually overlapped and bonded together; and a plurality of diffuser particles embedded in said substrate, said particles comprising a plurality of elliptically deformed microspheres that are elongated in said first direction, said elliptically deformed microspheres being spaced from one another in said first direction by distances that are substantially greater than the distances between particles in said second direction.

9. A rear projection screen, comprising:

a liquid crystal display panel having front and rear surfaces;

at least one layer of transparent acrylic substrate having first and second mutually angulated axes defining first and second directions, and a plurality of acrylic diffuser particles carried by said substrate, wherein said substrate's thickness and a concentration of said diffuser particles has an approximately linear relationship, said particles being elongated in said second direction, said substrate further comprising a sheet of transparent polymeric light diffuser material having seven micron microspheres embedded therein, said sheet being stretched in a second direction, said microspheres being elliptically deformed and elongated in said second direction mounted upon the rear surface of the liquid crystal display panel;

said substrate having the concentration of between 20 and 30 percent of said diffuser particles to a material thickness of approximately one half after stretching.

10. A back lighted liquid crystal display panel, comprising:

a liquid crystal display panel having a front and a rear surface;

a transparent acrylic substrate elliptical diffuser sheet having first and second mutually angulated axes defining first and second directions, and a plurality of acrylic diffuser particles carried by said substrate, wherein said substrate's thickness and a concentration of said diffuser particles has an approximately linear relationship said particles being elongated in said second direction, said substrate further comprising a sheet of transparent polymeric light diffuser material, having seven micron microspheres embedded therein, said sheet being stretched in a second direction, said microspheres being elliptically deformed and elongated in said second direction mounted upon the rear surface of the liquid crystal display panel, said diffuser sheet layered upon said rear surface of said liquid crystal display panel;

at least one lamp illuminating said diffuser sheet; and at least one reflector reflecting said lamp.

* * * * *

UNITED STATES PATENT AND TRADEMARK OFFICE
CERTIFICATE OF CORRECTION

PATENT NO. : 5,473,454
DATED : December 5, 1995
INVENTOR(S) : Randall D. Blanchard It is certified that error appears in the above-indentified patent and that said Letters Patent is hereby corrected as shown below:

Column 4, line 24: delete "≠" and insert -- +3 --.

Column 4, line 51: delete "15" and insert -- 15° --.

Column 4, line 53: delete "15" and insert -- 15° --.

Signed and Sealed this

Twenty-sixth Day of November 1996

Attest:

BRUCE LEHMAN

Attesting Officer

Commissioner of Patents and Trademarks